United States Patent [19]
Mancini et al.

[11] Patent Number: 5,464,309
[45] Date of Patent: Nov. 7, 1995

[54] DUAL WALL MULTI-EXTRACTION TUBE RECOVERY WELL

[75] Inventors: Alfonso R. Mancini, Penfield; Richard A. Williams, Savannah, both of N.Y.

[73] Assignee: Xerox Corporation, Stamford, Conn.

[21] Appl. No.: 326,674

[22] Filed: Oct. 20, 1994

Related U.S. Application Data

[63] Continuation-in-part of Ser. No. 56,349, Apr. 30, 1993, Pat. No. 5,358,357.

[51] Int. Cl.⁶ .................. E03B 3/12; E21B 43/00
[52] U.S. Cl. .............. 405/258; 405/128; 166/236; 166/268; 166/372
[58] Field of Search .................. 405/128, 129, 405/258; 166/236, 271, 268, 275, 306, 372

[56] References Cited

U.S. PATENT DOCUMENTS

| | | | |
|---|---|---|---|
| Re. 33,102 | 10/1989 | Visser et al. | 166/267 |
| 753,045 | 2/1904 | Cooper | 166/372 X |
| 1,291,130 | 1/1919 | Purchas . | |
| 1,547,194 | 7/1925 | Arbon | 166/372 X |
| 2,026,419 | 12/1935 | Davidson | 166/372 X |
| 2,605,637 | 8/1952 | Rhoades | 166/313 X |
| 2,925,097 | 2/1960 | Duesterberg | 166/313 X |
| 3,743,355 | 7/1973 | Blackwell et al. | 299/12 |
| 4,017,120 | 4/1977 | Carlson et al. | 166/372 X |
| 4,046,198 | 9/1977 | Gruesbeck et al. | 166/236 X |
| 4,180,980 | 1/1980 | Marks et al. | 417/108 X |
| 4,267,885 | 5/1981 | Sanderford | 166/372 X |
| 4,323,122 | 4/1982 | Knopik | 166/267 |
| 4,392,532 | 7/1983 | Raggio | 166/372 |
| 4,444,260 | 4/1984 | Boyd et al. | 166/267 |
| 4,497,370 | 2/1985 | Breslin | 166/372 |
| 4,593,760 | 6/1986 | Visser et al. | 166/267 |
| 4,625,801 | 12/1986 | McLaughlin et al. | 166/267 |
| 4,660,639 | 4/1987 | Visser et al. | 166/267 |
| 4,730,672 | 3/1988 | Payne | 166/266 |

(List continued on next page.)

FOREIGN PATENT DOCUMENTS 505011 9/1992 European Pat. Off. .............. 405/128

OTHER PUBLICATIONS

"Venting for the Removal of Hydrocarbon Vapors from Gasoline Contaminated Soil", J. Environ. Sci. Health, A 17(1) (1982) pp. 31–44.

"Forced Venting to Remove Gasoline Vapor From a Large–Scale Model Aquifer", American Petroleum Institute Pub. No. 4431.

"EPA Site Demonstration of the Terva Vac Process" Mary K. Stinson, Aug. 1989.

*Primary Examiner*—John A. Ricci

[57] ABSTRACT

Disclosed is a process for removing contaminants from a contaminated area of the ground having a vadose zone and a water table, which comprises providing a borehole in the contaminated area to a depth below the water table; placing in the borehole to a depth below the water table a first perforated riser pipe; placing inside the first perforated riser pipe a second perforated riser pipe; placing inside the second perforated riser pipe a first vacuum extraction pipe with a bottom opening situated within the second perforated riser pipe; placing a second vacuum extraction pipe within the first perforated riser pipe but without the second perforated riser pipe; while introducing a gas into the second perforated riser pipe, applying a vacuum to the first vacuum extraction pipe and applying a vacuum to the second vacuum extraction pipe to draw gases and liquid from the soil into the first vacuum extraction pipe and the second vacuum extraction pipe and transport both gases and liquid to the surface as two-phase common streams through the first vacuum extraction pipe and the second vacuum extraction pipe; forming from the common streams at least one primarily liquid stream and at least one primarily gaseous stream; and separately treating the separated liquid and gas streams. Also disclosed is an apparatus for carrying out the process.

20 Claims, 4 Drawing Sheets

U.S. PATENT DOCUMENTS

| | | | |
|---|---|---|---|
| 4,834,178 | 5/1989 | Knecht et al. | 166/261 |
| 4,886,119 | 12/1989 | Bernhardt et al. | 166/267 |
| 4,890,673 | 1/1990 | Payne | 166/266 |
| 4,892,664 | 1/1990 | Miller | 210/747 |
| 4,895,085 | 1/1990 | Chips | 110/346 |
| 4,945,988 | 8/1990 | Payne et al. | 166/266 |
| 4,982,788 | 1/1991 | Donnelly | 166/266 |
| 5,009,266 | 4/1991 | Dieter | 166/245 |
| 5,018,576 | 5/1991 | Udell et al. | 166/272 |
| 5,031,697 | 7/1991 | Wellington et al. | 166/250 |
| 5,050,676 | 9/1991 | Hess et al. | 166/267 |
| 5,076,360 | 12/1991 | Morrow | 166/267 |
| 5,076,727 | 12/1991 | Johnson et al. | 405/128 |
| 5,116,163 | 5/1992 | Bernhardt | 405/128 |
| 5,161,613 | 11/1992 | Jones | 166/242 |
| 5,161,914 | 11/1992 | Rahn et al. | 405/128 |
| 5,169,263 | 12/1992 | Johnson et al. | 405/128 |
| 5,172,764 | 12/1992 | Hajali et al. | 166/267 |
| 5,190,108 | 3/1993 | Mansuy | 166/371 |
| 5,197,541 | 3/1993 | Hess et al. | 166/67 |
| 5,246,070 | 9/1993 | Greve et al. | 166/242 |
| 5,249,888 | 10/1993 | Braithwaite et al. | 405/128 |
| 5,271,467 | 12/1993 | Lynch | 166/370 |
| 5,271,693 | 12/1993 | Johnson et al. | 405/128 |
| 5,332,333 | 7/1994 | Bentley | 405/128 |
| 5,348,420 | 9/1994 | Bernhardt | 405/128 X |

5,464,309

1

DUAL WALL MULTI-EXTRACTION TUBE RECOVERY WELL

This application is a continuation-in-part of copending application U.S. Ser. No. 08/056,349, now Pat. No. 5,358, 357 entitled "Improved Process and Apparatus for High Vacuum Groundwater Extraction," the disclosure of which is totally incorporated herein by reference.

BACKGROUND OF THE INVENTION

This invention is directed to a process and apparatus for removing chemical contaminants from groundwater. More particularly, the present invention is directed to a process and apparatus in which vacuum extraction is used to remove soil contaminants from both the saturated and vadose zones. One embodiment of the present invention is directed to a process for removing contaminants from a contaminated area of the ground having a vadose zone and a water table, which comprises providing a borehole in the contaminated area to a depth below the water table; placing in the borehole to a depth below the water table a first perforated riser pipe; placing inside the first perforated riser pipe a second perforated riser pipe; placing inside the second perforated riser pipe a first vacuum extraction pipe with a bottom opening situated within the second perforated riser pipe; placing a second vacuum extraction pipe within the first perforated riser pipe but without the second perforated riser pipe; while introducing a gas into the second perforated riser pipe, applying a vacuum to the first vacuum extraction pipe and applying a vacuum to the second vacuum extraction pipe to draw gases and liquid from the soil into the first vacuum extraction pipe and the second vacuum extraction pipe and transport both gases and liquid to the surface as two-phase common streams through the first vacuum extraction pipe and the second vacuum extraction pipe; forming from the common streams at least one primarily liquid stream and at least one primarily gaseous stream; and separately treating the separated liquid and gas streams. Another embodiment of the present invention is directed to an apparatus for removing contaminants from a contaminated area of the ground having a water table and a vadose zone above the water table which comprises a first perforated riser pipe extending downwardly from the surface of the ground to a level below the water table, a second perforated riser pipe situated inside the first perforated riser pipe and extending downwardly from the surface of the ground to a level below the water table, a first vacuum extraction pipe situated inside of the second perforated riser pipe and having a bottom opening situated within the second perforated riser pipe, a second vacuum extraction pipe situated inside the first perforated riser pipe but without the second perforated riser pipe, a gas inlet for introducing a gas into the second perforated riser pipe, at least one vacuum-forming apparatus in fluid communication with the first vacuum extraction pipe and the second vacuum extraction pipe and adapted to form a zone of reduced pressure in the ground around the first perforated riser pipe, whereby gases and liquid can be drawn from the ground into the first vacuum extraction pipe and the second vacuum extraction pipe and conveyed to the surface as two-phase common streams, and a means for receiving the two-phase common streams and separating the two-phase common streams into separate gas and liquid streams.

Contaminants can exist in subsurface soil and groundwater in the liquid or vapor phase as discrete substances and mixed with and/or dissolved in groundwater and soil gases. Various contaminants can be found in groundwater and soil, such as volatile compounds, including volatile organic compounds, nonvolatile materials, metal contaminants, and the like. Such contaminants can be found and dealt with in the vadose (unsaturated) zone found between the surface of the earth and the water table, at the interface between the vadose zone and the water table, and in the saturated zone below the water table.

At many industrial and commercial facilities and at waste handling and disposal sites, soil and groundwater are contaminated with suspended or water-soluble chemicals, or both. A variety of techniques have been used for removal of contaminants and remediation of affected soil. One common technique entails the excavation and off-site treatment of the soil. Another technique entails saturating the contaminated soil with water in situ, causing the contaminants to be leached slowly from the soil by the water. The contaminated water can then be removed.

Techniques have also been proposed for removing volatile organic contaminants from soil by vacuum extraction. For example, in U.S. Pat. 4,323,122, it was proposed that a vacuum be applied in a borehole at the level of the water table, the assumption being that a contaminant such as gasoline, which is lighter than water, would float on the water table and present a layer that could be drawn off by vacuum applied to the liquid at or around that level. U.S. Pat. 4,323,122 (Knopik) discloses a system and method for recovering organic liquid such as gasoline which has settled on the water table in underground areas. The system comprises a conduit extending from the ground surface to a point just above the water table, a collection head fitted on the lower end of the conduit, a collection vessel connected to the upper end of the conduit, and an exhaust means for creating less than atmospheric pressure in the vessel. The collection head has a liquid impermeable end portion and a liquid permeable intermediate portion for permitting the passage of liquid. The process comprises providing an opening in the ground to a point beneath the surface of the water table, positioning the conduit with the collection head in place so that the liquid permeable wall of the collection head is just above the surface of the water table, connecting the conduit to the collection vessel intake, and exhausting air and other gaseous materials from the vessel to cause liquid to flow into the collection head through the conduit into the vessel.

Others have suggested the possibility of venting soil above the water table (i.e., in the vadose zone) to cause vaporization of the contaminant in the soil, and then drawing off the contaminant in the vapor phase. Groundwater requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. For example, U.S. Pat. 4,660,639 (Visser et al.), the disclosure of which is totally incorporated herein by reference, discloses a process for the removal of volatile contaminants from the vadose zone of contaminated ground by extracting volatilized contaminants from the vadose zone by way of one or more vacuum extraction wells. The process entails drilling one or more wells into the subsurface media in the contaminated area, the well being constructed so that fluids in the vadose zone can flow into the well, whereas the liquid in the saturated zone below the water table cannot substantially flow into the well. The borehole and conduit of the well can optionally extend below the water table, in which case the vacuum applied to the upper portion of the conduit will be effective to draw contaminant from the vadose zone, but insufficient to draw a significant amount of water from the saturated zone into the conduit. If it is desired to remove groundwater from below the water table, this removal is accomplished either by a separate sampling device situated in the borehole or through a separate well.

In addition, Stinson, "EPA Site Demonstration of the Terra Vac In Situ Vacuum Extraction Process in Groveland, Mass.", Air & Waste Management Association, Vol. 39, No. 8, pages 1054 to 1062 (1989), the disclosure of which is totally incorporated herein by reference, discloses an evaluation of an in situ vacuum extraction process. The process entails removal of contaminants from the vadose zone by vacuum. Wells are installed in the contaminated vadose soil. A vacuum pump or blower induces air flow through the soil, stripping and volatilizing volatile organic compounds from the soil matrix into the air stream. Liquid water, if present in the soil, is also extracted along with the contamination. The two-phase stream of contaminated air and water flows to a vapor/liquid separator where contaminated water is removed. The contaminated air stream then flows through a treatment system such as gas-phase activated carbon to remove contaminants from the air stream. The clean air is exhausted to the atmosphere through a vent. U.S. Pat. 4,593,760 (Visser et al.), the disclosure of which is totally incorporated herein by reference, and U.S. Pat. No. Re. 33,102, the disclosure of which is totally incorporated herein by reference, also disclose processes for removal of volatile contaminants from the vadose zone of contaminated ground by pumping volatilized contaminants from the vadose zone using one or more vacuum extraction wells.

"Forced Venting to Remove Gasoline Vapor from a Large-Scale Model Aquifer," American Petroleum Institute, Health and Environmental Sciences Department, API Publication No. 4431 (1984) discloses the results of experiments examining forced venting of air through the soil above a gasoline spill in a model aquifer. Various flow rates and geometries for the venting plumbing were used to determine the most efficient method of removing gasoline from the underground environment and lowering gasoline vapor concentrations in the unsaturated zone above the spill.

"Venting for the Removal of Hydrocarbon Vapors from Gasoline Contaminated Soil," J. Thornton and W. Wootan, *J. Environ. Sci. Health*, A17(1), 31–44 (1982) discloses the results of an experiment investigating the use of a venting strategy to remove gasoline vapors from contaminated soil strata. A contained gasoline leak was created in a large outdoor facility which simulates soil strata and a static water table. An air flow was established, and vapor samples taken before, during, and after venting were checked for hydrocarbon content.

U.S. Pat. No. 4,892,664 (Miller), the disclosure of which is totally incorporated herein by reference, discloses a method and system for decontaminating water, such as groundwater or process effluent, which is contaminated by small concentrations of dissolved volatile organic compounds. The process includes introducing a flow of the water to an air stripping stage in which the water is directed through the column to air strip organic molecules from the contaminated water, releasing the decontaminated water to the environment, pretreating the organic compounds carrying air in the substantial absence of water through a preheater, passing the heated air through a catalytic stage that oxidizes the organic compounds, and releasing the gaseous effluent from the catalytic stage to the atmosphere. Water containing small concentrations of dissolved volatile organic compounds can also be decontaminated by including an apparatus for retrofitting an existing air stripper for this purpose.

U.S. Pat. No. 4,444,260 (Boyd et al.) discloses a method for the treatment of oil well production streams to process oil-contaminated sand to recover oil therefrom and produce an ecologically acceptable clean sand residue. The process entails separating the production fluid from an oil well having sand entrained therein from a plurality of components, one of which comprises an oil-contaminated sand. The contaminated sand is contacted with a light oil solvent to initiate a solvating action of the oil contaminant. The resulting mixture of oil-contaminated sand and solvent is then contacted with water and the system then gravity separated into discrete sand, water, and oil phases. The oil and water phases can be removed from the sand and the sand phase again contacted with water and the resulting mixture is then subjected to gravity separation to produce separate sand and water phases. The water phase is then removed and the sand passed to a suitable disposal facility.

U.S. Pat. No. 4,730,672 (Payne) and U.S. Pat. No. 4,890,673 (Payne), the disclosures of each of which are totally incorporated herein by reference, disclose a method and apparatus for collecting volatile contaminants from the vadose layer of earth. The apparatus is a closed-loop device which includes one or more contaminant withdrawal wells surrounded by multiple air reinjection wells connected by a conduit. One or more pumps serve to draw volatilized contaminant through the withdrawal well to the connecting conduit where it is captured or neutralized. Residual air from the withdrawal well is urged back into the ground through the air reinjection wells to encourage further contaminant to move toward the withdrawal well for collection.

U.S. Pat. No. 4,945,988 (Payne et al.), the disclosure of which is totally incorporated herein by reference, discloses a process for removing and disposing of or neutralizing volatile contaminants existing in the vadose zone of earth and also in a below ground aquifer. The process includes the injection of substantially oxygen free air into the aquifer to retard the formation of aerobic bacteria and injection of oxygen rich air into the vadose zone to stimulate bacterial growth which aids contaminant recovery. Volatilized contaminants are pulled out of the soil through withdrawal wells which terminate in the vadose zone.

U.S. Pat. No. 4,886,119 (Bernhardt et al.) discloses a process for driving volatile impurities from a ground by means of air by aspirating an afterflow air and impurities containing gases which penetrated through a permeable wall of a shaft in a ground, at one or several locations. In regions of expected high gas contents, air afterflow passages are extended to these regions for supplying the afterflow air, and an adjustable afterflow resistance is arranged in the passages for influencing a negative pressure value and a flow speed in these regions.

U.S. Pat. No. 3,743,355 (Blackwell et al.) discloses a method for withdrawing hazardous gases from a water saturated subterranean formation containing a mineral deposit suitable for mining. The process entails drilling wells through the subterranean formation and withdrawing water from the subterranean formation to establish permeability to gas within the subterranean formation. Gas is then withdrawn from the formation by means of the wells. The method is particularly applicable for reducing the influx of radon into a mine contained in a mineral deposit.

U.S. Pat. No. 1,547,194 (Arbon) discloses a system for elevating oil consisting in packing a well between the eduction tube and casing to cause the accumulation of the gas, arranging valved ejectors in said tube above and below the packing, and regulating the valves to cause successive elevation of fluid in the tube.

U.S. Pat. No. 753,045 (Cooper) discloses a method of obtaining gas from wells containing water with gas held in solution which consists in lifting the water in the well by means of a hydrocarbon gas introduced under pressure into the water column below and collecting the gas liberated from the lifted water.

U.S. Pat. No. 1,291,130 (Purchase) discloses an eduction pipe for air lifts, the cross section of which varies in steps, the maximum cross section being at the bottom and adapted to be submerged, the minimum cross section following the maximum cross section, the section larger than the minimum but smaller than the maximum following the minimum section.

U.S. Pat. No. 2,026,419 (Davidson) discloses an apparatus and process for enlarging the normal subterranean liquid capacity of the supply area of a tube well which consists of oscillating indigenous liquid of the area by pumping forces set up in the tube to dislodge alluvium and simultaneously applying air pressure to remove the alluvium from the well.

U.S. Pat. No. 4,017,120 (Carlson et al.) discloses the production of hot brines containing dissolved gases from liquid dominated geothermal wells by utilizing lift gases of essentially the same composition as the dissolved gases. The lift gas is separated from the produced brine and recycled. Heat is abstracted from the separated brine, which may be returned to the aquifer, processed for its mineral content, or discarded. The gas lift is carried out under temperature and pressure conditions such that the precipitation of minerals from the brine does not occur in the well bore.

U.S. Pat. No. 4,180,980 (Marks et al.) discloses a method and apparatus for releasing for use air that has been absorbed under pressure in sea water or in any other large free body of water. An elongated conduit or other equivalent means is vertically disposed so that air released from its upper end is collected by an open bottom container serving as a reservoir. The interface of the collected air and the submersion level of water within the reservoir is substantially below the free water surface level. A small amount of gas is introduced at the lower end of the conduit so as to rise upwardly through the conduit, thereby carrying water behind it, and to initiate a continuous process in which the rising water is under decreasing pressure, at times increasing temperature, thereby releasing more air, which in turn carries more water behind it. Air from the reservoir can be used as an energy source.

U.S. Pat. No. 4,267,885 (Sanderford) discloses a method and apparatus to optimize and control the production of an oil well which is being artificially produced by gas-lift techniques. The invention is suitable for use with either continuous or intermittent gas-lift operation and can be used with a combination of both. The temperature of the fluid at the wellhead is sensed and used to determine the injection parameter values to optimize well production. In one embodiment, a process control unit is programmed according to the inventive method to interpret the temperature data and to control the gas control valve to optimize production.

U.S. Pat. No. 4,895,085 (Chips) discloses a method and structure whereby contaminated soil is decontaminated in situ by the extraction of vapor from the soil and subsequent destruction of the contaminants contained in the interstitial fluid of the soil by processing the fluid through an internal combustion engine or other suitable combustion means. To achieve this purpose, a means of conducting the fluid from the soil to a manifold system is provided.

U.S. Pat. No. 4,982,788 (Donnelly) discloses an apparatus and method for removing hazardous volatile contaminants from the ground by circulating air between two substantially parallel wells and by removing the vapors of the organic compound from the circulated air using at least one of a condenser and a demister. To enhance efficiency the air is recirculated in a closed loop. The heat output of the condensation process is used to heat the recirculated air. Pipes having openings along only a limited portion of their lengths are placed in the wells and the depth of the openings adjusted to treat one level at a time, thereby preventing shunting of air through more porous soil layers. Flow rates can be equalized by using circumferentially placed induction wells surrounding an extraction well (or the reverse) and by controlling air flow through individual sections of a given level.

U.S. Pat. No. 5,009,266 (Dieter) discloses a method for the in situ removal of mobilizable contaminants, including volatile and semi-volatile organic compounds, from a contaminated unsaturated zone of primarily porous layers of soil. The method comprises pulsatilely injecting heated pressurized steam into a first location in the zone to heat the soil in the zone, and withdrawing the contaminants under subatmospheric pressure from the soil at a second location in the zone. In specific application, the pulsatile injection of steam is used to heat the soil without directly recovering injected steam for a significant period of time until the targeted soil in the zone is uniformly heated to steam temperature. The pulsatile injection directs the heat in particular directions and to particular areas in the soil zone as desired.

U.S. Pat. No. 5,018,576 (Udell et al.) discloses a method for in situ decontamination of contaminated subsurface area by injection of steam into injection wells and withdrawing liquids and vapors from extraction wells under subatmospheric pressure whereby steam is passed through the contaminated area in an essentially horizontal direction. After a substantial portion of the contamination has been removed in this manner, the injection of steam is ceased, but the extraction at subatmospheric pressure is continued, to volatilize and remove the residual water and contaminants trapped in the pores of the soil. The steam injection may be periodically resumed to reheat the area and to replenish the water in the pores.

U.S. Pat. No. 2,605,637 (Rhoades), the disclosure of which is totally incorporated herein by reference, discloses a method of subterranean surveying to determine the liquid levels of a plurality of superimposed fluid bearing strata through a single drill hole. A plurality of tubes are housed within a single drill hole. The tubes are positioned at varying subterranean fluid bearing strata and are used to measure liquid levels in each of the isolated strata.

U.S. Pat. No. 2,925,097 (Duesterberg), the disclosure of which is totally incorporated herein by reference, discloses a tubular member adapted to be positioned in the flow string of an oil or gas well. A plurality of flow tubes are placed within a wellbore for removing well fluids. The tubes comprise a perforate section that prevents cutting out or eroding caused by high fluid pressure or abrasive fluids.

U.S. Pat. No. 4,834,178 (Knecht et al.), the disclosure of which is totally incorporated herein by reference, discloses a process and apparatus for fireflooding with liquid heat transfer media comprising injection of oxidant gas and liquid heat transfer media into a well through separate conduits, the liquid conduit downstream end submerged in a liquid volume, so as to form a seal and prevent oxidant gas migration into the liquid conduit.

U.S. Pat. No. 5,161,613 (Jones), the disclosure of which is totally incorporated herein by reference, discloses a method and apparatus for treating multiple strata in a single operation from a single wellbore which penetrates a treatment interval which, in turn, includes a plurality of strata which, in turn, have different permeabilities. A treating fluid, such as a consolidating agent, acid, or the like, is delivered directly to different levels within a section of the wellbore adjacent the interval to be treated through a plurality of alternate paths which, in turn, lie substantially adjacent to the strata to be treated.

U.S. Pat. No. 5,190,108 (Mansuy), the disclosure of which is totally incorporated herein by reference, discloses the inhibition of biological fouling of water wells by replacing the air in the well column with an anoxic gas such as nitrogen to deprive aerobic bacteria of oxygen. The anoxic gas is applied from a cylindrical tank at the surface and through a gas pipe extending from the tank down into the well casing. The well casing is sealed near the top to prevent air infiltration and maintain a positive gas pressure. The anoxic gas is applied at a slightly positive pressure to maintain the well column filled with it and to prevent air penetration. The gas can be supplied to the well column only or to both the well column and the aquifer so that a blanket of gas in the area of the well inhibits air penetration of the water from the unsaturated cover layer above the aquifer.

U.S. Pat. No. 5,246,070 (Greve et al.), the disclosure of which is totally incorporated herein by reference, discloses a method for completing a groundwater monitoring site including several monitoring points disposed at different depths. The piping includes a single multi-conduit pipe having a smooth, tightly packable outer wall and being composed of individual pipe lengths which are coupled to each other in a sealed relationship. The pipe lengths are subdivided in the longitudinal direction into several conduits by partition walls and are coupled to each other in such a fashion that their conduits are in relative alignment at the junctures and not reduced in area. For the purpose of providing filter sections for the admission of water, individual pipe lengths are provided in their outer wall with filter slots in the area of one or several conduits.

U.S. Pat. No. 5,271,467 (Lynch), the disclosure of which is totally incorporated herein by reference, discloses methods and systems for recovering groundwater, gases and vapors from subsurface locations in a single, integrated operation by applying a vacuum to groundwater recovery wells. Selective recovery of specific contaminants from zones of interest containing high levels of those contaminants is achieved by manipulating the local water table level. Groundwater recovery systems may also utilize eductor systems having venturi nozzles that create a vacuum networked. A plurality of such recovery wells operated using eductor systems may be operated by a single pump at or above grade level. In this fashion, a network of recovery wells may be operated using a single pump and control system. The recovery methods and systems are preferably utilized in association with known contaminant removal systems to provide complete removal of contaminants and improved remediation efficiencies.

U.S. Pat. No. 4,625,801 (McLaughlin et al.) discloses methods and apparatus for the recovery of petroleum origin hydrocarbons from ground water tables at sites of refineries, oil and gasoline storage and distributing facilities, and the like. Pursuant to the invention, separate liquid handling devices, each in the nature of a vessel or canister and having liquid trapping and ejecting facilities that are free of mechanical pumping action, are employed for raising the ground water and liquid hydrocarbons that accumulate on the ground water table, respectively, through which the well or wells extend, and under the static pressure of the compressed air. The indicated devices are suspended in the same or adjacent wells that are located at the site, with the ground water handling device being connected to a source of compressed air and piping for carrying away the water to form a cone of depression at the site, and the hydrocarbon handling device being connected to the source of compressed air and a recovery line for separately surfacing and conveying the hydrocarbons to a point of collection and recovery. The invention also provides for use of one of the vessels and associated equipment to pump both liquids from the well to the ground surface for separation of same by a conventional separator.

U.S. Pat. No. 4,497,370 (Breslin) discloses an apparatus and method for recovery of liquid hydrocarbons on ground water in which one or more perforate, small diameter well casings are installed in the ground in or at least adjacent to a contaminated soil area containing the liquid hydrocarbons. A liquid recovery unit is in each well casing and each recovery unit has a hollow housing covered by a semi-permeable membrane which passes liquid hydrocarbons but blocks the flow of ground water into the housing. The liquid hydrocarbons collected in the housings can be moved to a receiver by pressurizing the housings, by suction applied to the housings, by pressurizing the well casings, and by the use of submersible pumps near the housings.

U.S. Pat. No. 4,392,532 (Raggio) discloses a method for locating gas lift valves in properly spaced manner within a string of production tubing extending to a production zone within a well. During calculations for valve spacing and set pressures, the spacing and reopening pressures of the valves are corrected to the lowest temperature that is expected to be encountered at any valve while lifting from the next lower valve of the gas lift valve and piping system. An average between the flowing temperature corresponding to the rate to be produced from the next deepest valve and the geothermal temperature gradient are employed to calculate the reopening pressure of any given valve.

U.S. Pat. No. 5,031,697 (Wellington et al.) discloses a method for troubleshooting gas lift wells, to identify whether gas lift valves on the production tubing are open or closed, without the use of wireline tools. The method may also be used to detect leaks in the production tubing or in the well casing. A quantity of a tracer gas is injected into the lift gas at the wellhead, and its return in fluid produced from the well is monitored as a function of time. The tracer's return pattern may be correlated with the depth of entry points and volumes of lift gas entering along the length of the production tubing.

U.S. Pat. No. 5,076,360 (Morrow), the disclosure of which is totally incorporated herein by reference, discloses a method and apparatus for vacuum extraction of contaminants from the ground which, in a preferred embodiment, involves vacuum withdrawal of liquid and gaseous phases as a common stream, separation of the liquid and gaseous phases, and subsequent treatment of the separated liquid and gases to produce clean effluent. A primed vacuum extraction employs a single vacuum generating device to remove contaminants in both the liquid stream and soil gases through a single well casing utilizing a priming tube which introduces air or other gas to the liquid collected at the bottom of a well, permitting vacuum extraction of both liquids and gases from the subsurface by way of wells having a liquid layer which is more than thirty feet below the soil surface or in which a screened interval of the extraction pipe is entirely below the liquid surface.

U.S. Pat. No. 5,050,676 (Hess et al.) and U.S. Pat. No. 5,197,541 (Hess et al.), the disclosures of each of which are totally incorporated herein by reference, disclose an apparatus and process for extracting contaminants from soil both above and below the water table. The process comprises placing a perforated riser pipe in a borehole in a selected portion of the contaminated area, wherein the perforations of the riser pipe are situated below the water table. Optionally, some of the perforations in the riser pipe can also be situated in the vadose zone above the water table. A vacuum is then applied to the pipe to draw gases and liquids from the soil into the pipe and to transport the gases and liquids to the surface as a common stream. At the surface, the common stream is separated into a primarily liquid stream and a primarily gaseous stream, and the separated streams are then treated separately.

U.S. Pat. No. 5,172,764 (Hajali et al.), the disclosure of which is totally incorporated herein by reference, discloses a process for removing contaminants from a contaminated area of the ground having a vadose zone and a water table which comprises providing a borehole in the contaminated area; placing in the borehole a perforated riser pipe inside of which is situated a vacuum extraction pipe with an opening situated near, at, or at any point below the water table within the perforated riser pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a common stream; forming from the common stream a stream which is primarily liquid and a stream which is primarily gaseous; and separately treating the separated liquid and gas streams. Also disclosed is an apparatus for carrying out the process.

Copending application U.S. Ser. No. 08/056,349, filed Apr. 30, 1993, entitled "Improved Process and Apparatus for High Vacuum Groundwater Extraction," with the named inventors Alfonso R. Mancini, Ronald E. Hess, Richard A. Williams, Douglas J. Montgomery, and Heinrich J. Jurzysta, the disclosure of which is totally incorporated herein by reference, discloses a process and apparatus in which vacuum extraction is used to remove soil contaminants in both the saturated and vadose zones. One embodiment of the invention is directed to a process for removing contaminants from a contaminated area of the ground having a vadose zone and a water table, which comprises providing a borehole in the contaminated area to a depth below the water table; placing in the borehole to a depth below the water table a perforated riser pipe inside of which is situated a vacuum extraction pipe with a bottom opening situated within the perforated riser pipe, said vacuum extraction pipe containing groundwater prior to application of a vacuum thereto, said vacuum extraction pipe having at least one gas inlet situated below the groundwater level in the vacuum extraction pipe; while introducing a gas into the riser pipe, applying a vacuum to the vacuum extraction pipe to draw gases and liquid from the soil into the perforated riser pipe and from the riser pipe into the vacuum extraction pipe and transport both the gases and the liquid to the surface as a two-phase common stream; introducing a gas into the vacuum extraction pipe at a level below the groundwater level in the vacuum extraction pipe to initiate two-phase flow within the vacuum extraction pipe; forming from the common stream a stream which is primarily liquid and a stream which is primarily gaseous; and separately treating the separated liquid and gas streams. Also disclosed is an apparatus for carrying out the process.

Copending application U.S. Ser. No. 08/235,571, filed Apr. 29, 1994, entitled "High Vacuum Extraction of Soil Contaminants Along Preferential Flow Paths," with the named inventors Eliott N. Duffney, Paul M. Tornatore, Scott M. Huber, and Ronald E. Hess, the disclosure of which is totally incorporated herein by reference, discloses a process for removing contaminants from a contaminated area of the ground comprising soil having a first permeability, said ground having a plurality of paths of preferential flow, each path having a permeability at least ten times greater than the first permeability, which process comprises providing a borehole in the contaminated area to intersect at least a first path of preferential flow and a second path of preferential flow, said second path of preferential flow being situated at a depth greater than said first path of preferential flow; placing in the borehole a first vacuum extraction pipe having a bottom opening situated within the first path of preferential flow and a second vacuum extraction pipe having a bottom opening situated within the second path of preferential flow; isolating the first path of preferential flow from the second path of preferential flow so that a vacuum applied to the first vacuum extraction pipe with a bottom opening situated in the first path of preferential flow will extract gases and liquids from the first path of preferential flow but not from the second path of preferential flow and a vacuum applied to the second vacuum extraction pipe with a bottom opening situated in the second path of preferential flow will extract gases and liquids from the second path of preferential flow but not from the first path of preferential flow; applying a vacuum to at least one of the vacuum extraction pipes to draw gases and liquid from at least one of the paths of preferential flow into a vacuum extraction pipe and transport both the gases and the liquid to the surface as a common stream; forming from the common stream a stream which is primarily liquid and a stream which is primarily gaseous; and removing contaminants from at least one of the liquid stream and the gaseous stream. Also disclosed is an apparatus for carrying out this process.

Copending application U.S. Ser. No. 08/236,791, filed Apr. 29, 1994, entitled "Apparatus and Process for Treating Contaminated Soil Gases and Liquids," with the named inventors Eliott N. Duffney, Paul M. Tornatore, Scott M. Huber, and Ronald E. Hess, the disclosure of which is totally incorporated herein by reference, discloses an apparatus for extracting contaminants from a stream comprising a contaminant-containing mixture of liquids and gases which comprises: (a) a contaminant-containing mixture input; (b) a vapor-liquid separator receiving the contaminant-containing mixture from the input and producing a liquid component stream at a first outlet and a gaseous component at a second outlet; (c) an optional first contaminant removal system receiving the liquid component stream from the vapor-liquid separator and producing a contaminant-free liquid stream; (d) a vacuum inducing device in fluid communication with the contaminant-containing mixture input and the vapor-liquid separator and receiving said gaseous component from the vapor-liquid separator; (e) a cooling element receiving the gaseous component at a first temperature from the vacuum inducing device and producing the gaseous component at a second temperature from a first outlet and a condensed liquid component from a second outlet, said second temperature being lower than said first temperature; (f) a heating element receiving the gaseous component from the cooling element at said second temperature and producing a reduced-relative-humidity gas component at a third temperature, said third temperature being higher than said second temperature, said heating element having a heating jacket surrounding a conduit through which the gaseous component passes through the heating element, said heating jacket receiving a heating fluid from a first heat fluid conduit into a heating jacket input and outputting said heating fluid from a heating jacket outlet into a second heating fluid conduit; and (g) an optional second contaminant removal system receiving the reduced-relative-humidity gas component from the heating element and producing a contaminant-free gas; wherein the apparatus necessarily includes either the first contaminant removal system or the second contaminant removal system.

Although known apparatuses and processes are suitable for their intended purposes, a need remains for a process and apparatus for removing contaminants from groundwater and soil which enables contaminant removal from below and/or above the water table. A need also remains for a process and apparatus for removing contaminants from groundwater and soil which enables contaminant removal from soils of varying air permeability and varying porosity. Further there is a need for a process and apparatus for removing contaminants from groundwater and soil which enables increased flexibility in the location of extraction wells. A need also exists for a process and apparatus for removing contaminants from groundwater and soil that enables vacuum extraction of contaminants through a well from below the water table when the water table is deeper than the equivalent lift of the vacuum pump connected to the well. There is also a need for a process and apparatus for removing contaminants from groundwater and soil with simplified equipment in that a single vacuum pump can be employed to remove contaminants in both the vapor and liquid phases through a single well or pipe. Additionally, there is a need for a process and apparatus for removing contaminants from groundwater and soil that enables reduction of contaminant concentrations in the extracted groundwater as a result of the mixing of air and water in the vacuum extraction pipe, leading to reduced subsequent water treatment requirements. In addition, there is a need for a process and apparatus for removing contaminants from groundwater and soil that dewaters the saturated zone (groundwater) in the vicinity of the extraction well in some soil conditions, thereby allowing air flow to move through the dewatered soil, which accelerates the extraction rate of contaminants and results in reduced cleanup time. Further, there is a need for a process and apparatus for removing various kinds of contaminants from groundwater and soil, including volatile materials, nonvolatile materials, metal contaminants, and the like. A need also remains for a process and apparatus for removing soil contaminants with improved, faster contaminant removal rates. There is also a need for apparatus and processes for removing soil contaminants through a vacuum extraction tube in a well wherein the depth of the extraction tube in the well can be easily adjusted. Further, there is a need for apparatus and processes for removing soil contaminants via a vacuum extraction process wherein the contamination of the vacuum source and processing equipment is reduced or eliminated.

SUMMARY OF THE INVENTION

It is an object of the present invention to provide a process and apparatus for removing contaminants from groundwater and soil with the above advantages.

It is another object of the present invention to provide a process and apparatus for removing contaminants from groundwater and soil which enables contaminant removal from below and/or above the water table.

It is yet another object of the present invention to provide a process and apparatus for removing contaminants from groundwater and soil which enables contaminant removal from soils of varying air permeability and varying porosity.

It is still another object of the present invention to provide a process and apparatus for removing contaminants from groundwater and soil which enables increased flexibility in the location of extraction wells.

Another object of the present invention is to provide a process and apparatus for removing contaminants from groundwater and soil that enables vacuum extraction of contaminants through a well from below the water table when the water table is deeper than the equivalent lift of the vacuum pump connected to the well.

Yet another object of the present invention is to provide a process and apparatus for removing contaminants from groundwater and soil with simplified equipment in that a single vacuum pump can be employed to remove contaminants in both the vapor and liquid phases through a single well or pipe.

Still another object of the present invention is to provide a process and apparatus for removing contaminants from groundwater and soil that enables reduction of contaminant concentrations in the extracted groundwater as a result of the mixing of air and water in the vacuum extraction pipe, leading to reduced subsequent water treatment requirements.

It is another object of the present invention to provide a process and apparatus for removing contaminants from groundwater and soil that dewaters the saturated zone (groundwater) in the vicinity of the extraction well in some soil conditions, thereby allowing air flow to move through the dewatered soil, which accelerates the extraction rate of contaminants and results in reduced cleanup time.

It is yet another object of the present invention to provide a process and apparatus for removing various kinds of contaminants from groundwater and soil, including volatile materials, nonvolatile materials, metal contaminants, and the like.

It is still another object of the present invention to provide a process and apparatus for removing soil contaminants with improved, faster contaminant removal rates.

Another object of the present invention is to provide apparatus and processes for removing soil contaminants through a vacuum extraction tube in a well wherein the depth of the extraction tube in the well can be easily adjusted.

Yet another object of the present invention is to provide apparatus and processes for removing soil contaminants via a vacuum extraction process wherein the contamination of the vacuum source and processing equipment is reduced or eliminated.

These and other objects of the present invention (or specific embodiments thereof) can be achieved by providing a process for removing contaminants from a contaminated area of the ground having a vadose zone and a water table, which comprises providing a borehole in the contaminated area to a depth below the water table; placing in the borehole to a depth below the water table a first perforated riser pipe; placing inside the first perforated riser pipe a second perforated riser pipe; placing inside the second perforated riser pipe a first vacuum extraction pipe with a bottom opening situated within the second perforated riser pipe; placing a second vacuum extraction pipe within the first perforated riser pipe but without the second perforated riser pipe; while introducing a gas into the second perforated riser pipe, applying a vacuum to the first vacuum extraction pipe and applying a vacuum to the second vacuum extraction pipe to draw gases and liquid from the soil into the first vacuum extraction pipe and the second vacuum extraction pipe and transport both gases and liquid to the surface as two-phase common streams through the first vacuum extraction pipe and the second vacuum extraction pipe; forming from the common streams at least one primarily liquid stream and at least one primarily gaseous stream; and separately treating the separated liquid and gas streams. Another embodiment of the present invention is directed to an apparatus for removing contaminants from a contaminated area of the ground having a water table and a vadose zone above the water table which comprises a first perforated riser pipe extending downwardly from the surface of the ground to a level below the water table, a second perforated riser pipe situated inside the first perforated riser pipe and extending downwardly from the surface of the ground to a level below the water table, a first vacuum extraction pipe situated inside of the second perforated riser pipe and having a bottom opening situated within the second perforated riser pipe, a second vacuum extraction pipe situated inside the first perforated riser pipe but without the second perforated riser pipe, a gas inlet for introducing a gas into the second perforated riser pipe, at least one vacuum-forming apparatus in fluid communication with the first vacuum extraction pipe and the second vacuum extraction pipe and adapted to form a zone of reduced pressure in the ground around the first perforated riser pipe, whereby gases and liquid can be drawn from the ground into the first vacuum extraction pipe and the second vacuum extraction pipe and conveyed to the surface as two-phase common streams, and a means for receiving the two-phase common streams and separating the two-phase common streams into separate gas and liquid streams.

BRIEF DESCRIPTION OF THE DRAWINGS

Illustrated schematically in FIG. 1 is a side elevation view in cross section illustrating an arrangement for vacuum extraction of contaminants from a contaminated area of the ground in accordance with the present invention.

Illustrated schematically in FIG. 2 is a cross-sectional view in side elevation of an extraction well suitable for the present invention.

Figure 3:
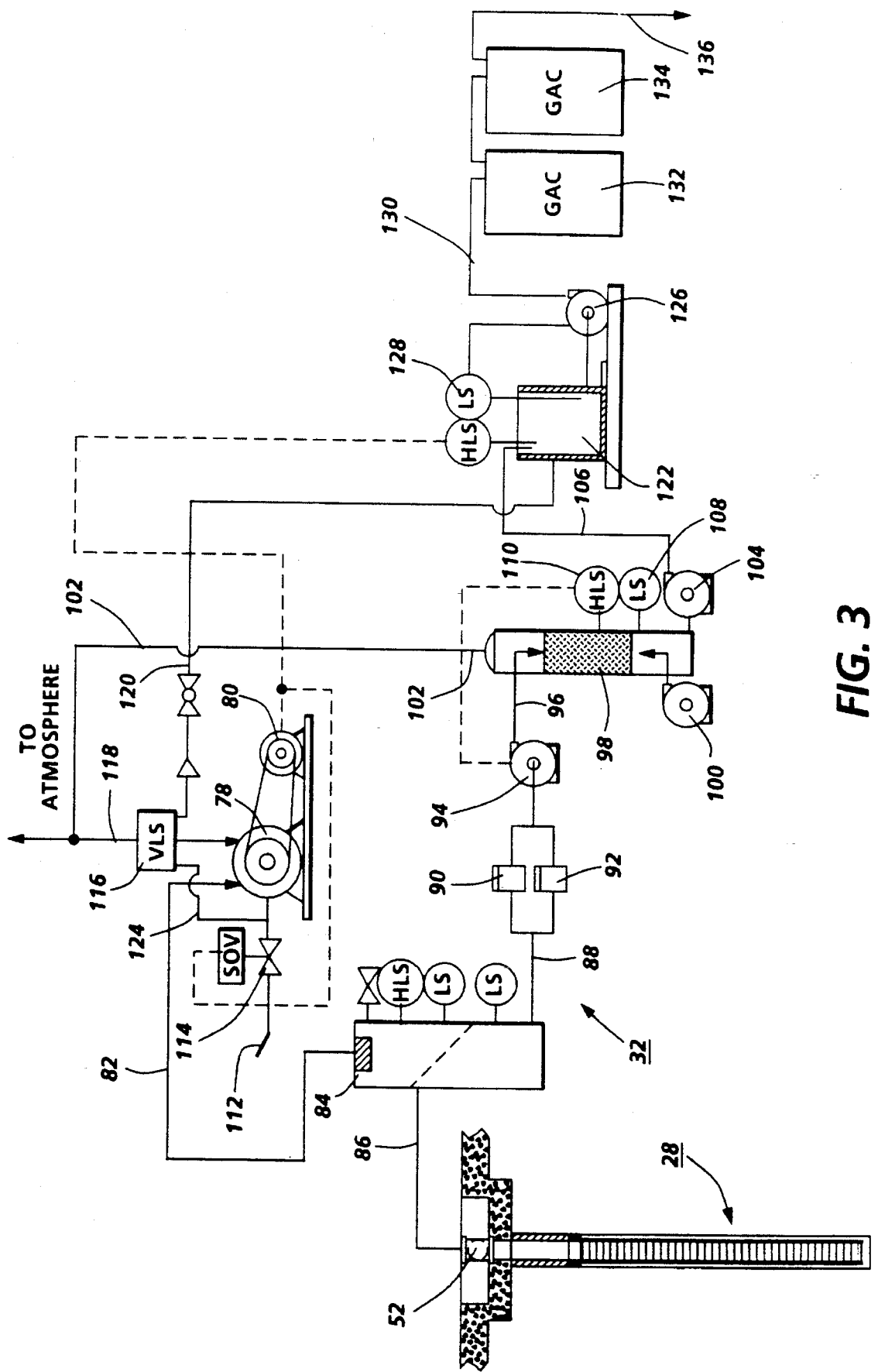

Illustrated schematically in FIG. 3 is a schematic view of an example of an apparatus for handling and treating materials removed from the ground by the vacuum extraction apparatus and process of the present invention.

Figure 4:
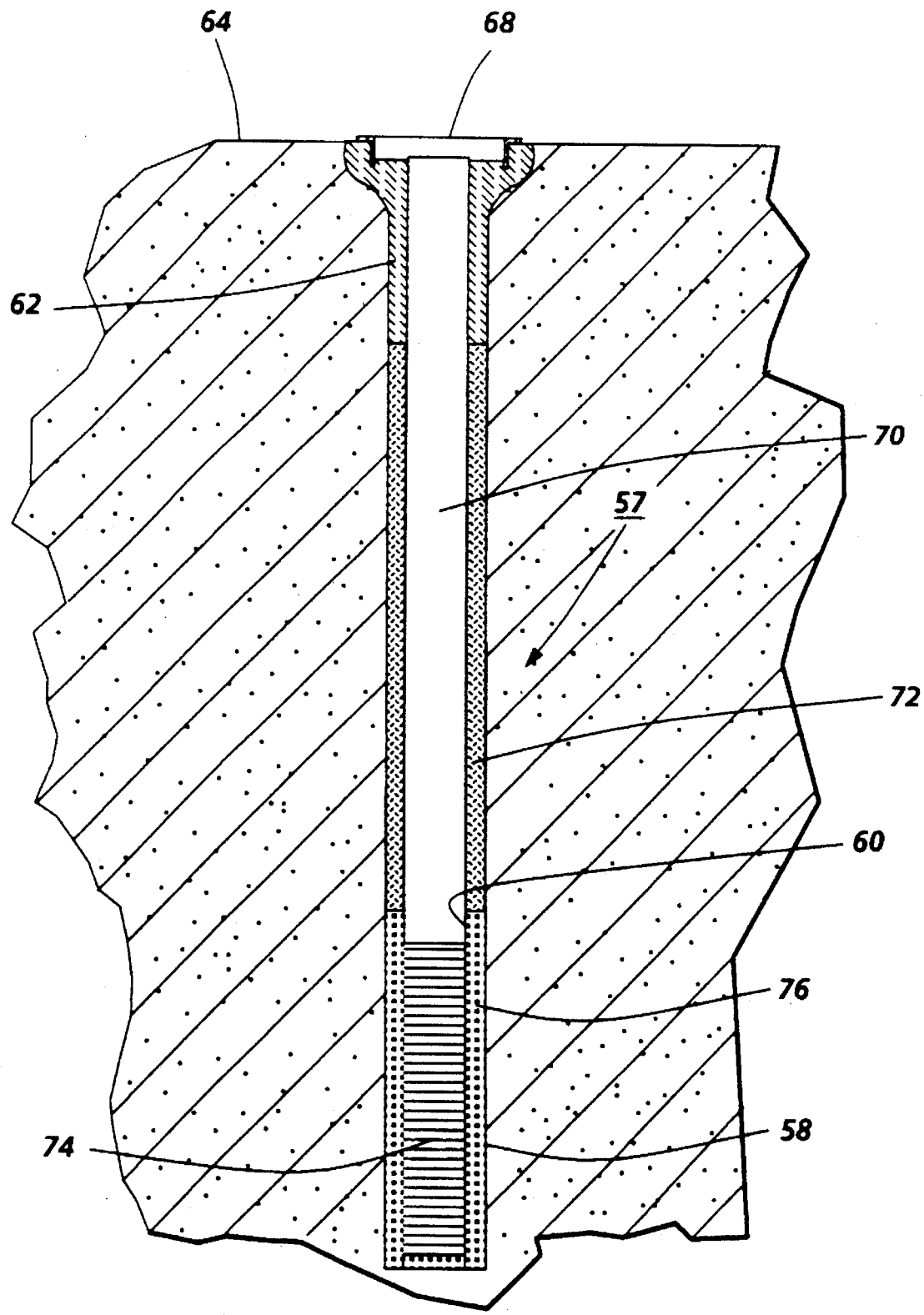

Illustrated schematically in FIG. 4 is a cross-sectional view in side elevation of an air inlet well suitable for use with the present invention.

DETAILED DESCRIPTION OF THE INVENTION

The present invention is directed to a process and apparatus for the removal of contaminants from groundwater and soil. Contaminants can be present in the vadose zone and/or below the water table. The process comprises the steps of providing a borehole in the contaminated area to a depth below the water table; placing in the borehole to a depth below the water table a first perforated riser pipe; placing inside the first perforated riser pipe a second perforated riser pipe; placing inside the second perforated riser pipe a first vacuum extraction pipe with a bottom opening situated within the second perforated riser pipe; placing a second vacuum extraction pipe within the first perforated riser pipe but without the second perforated riser pipe; while introducing a gas into the second perforated riser pipe, applying a vacuum to the first vacuum extraction pipe and applying a vacuum to the second vacuum extraction pipe to draw gases and liquid from the soil into the first vacuum extraction pipe and the second vacuum extraction pipe and transport both gases and liquid to the surface as two-phase common streams through the first vacuum extraction pipe and the second vacuum extraction pipe; forming from the common streams at least one primarily liquid stream and at least one primarily gaseous stream; and separately treating the separated liquid and gas streams. Treated water can be returned to the soil or disposed of in conventional ways. In one embodiment of the invention, the riser pipes are constructed with perforations (screening) extending both below the natural water table and upward into the unsaturated (vadose) zone. In another embodiment of the invention, the riser pipes are constructed with perforations (screening) extending only below the water table. The unsaturated zone can be the natural vadose zone lying above the natural water table, or an expanded "artificial" vadose zone created when removal of the groundwater through the extraction well causes local lowering of the water table. Placing of the screening so that it extends both below the water table and into the vadose zone allows soil gases, including contaminants in the vapor phase, to be drawn into the riser pipes under the influence of a vacuum generator connected to the vacuum extraction pipes. The gases entrain the liquid phase, so that both phases can be transported to the surface together in a common stream through the vacuum extraction pipes. At the surface, the two phases are separated in a vapor-liquid disengaging vessel, such as a cyclone separator, knock-out pot or other suitable component, and after separation the phases can individually be routed to systems for contaminant removal by further treatment steps. Suitable processes for contaminant removal include filtration, adsorption, air stripping, settling, flocculation, precipitation, scrubbing and the like.

In another embodiment, the riser pipes are constructed so that the screening is at all times below the water table, even in the situation in which removal of water causes local depression of the water table. In such an arrangement, the fluid transported to the surface is predominantly in the liquid phase, although it may still be necessary to provide vapor-liquid separation and individual phase treatment at the surface to deal with phase transformation which may occur as a result of turbulence and pressure reduction at the suction side of the vacuum device.

Figure 1:
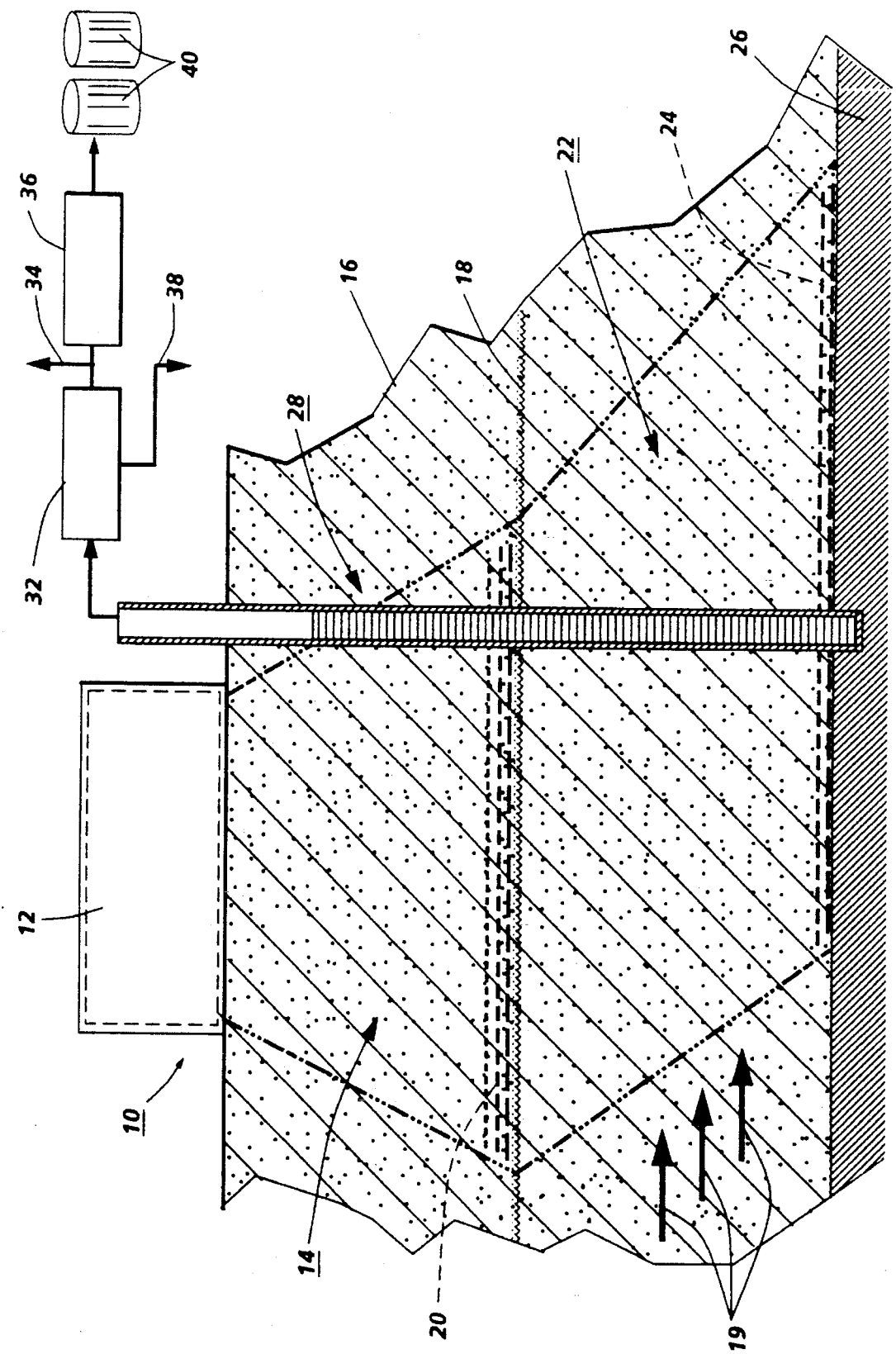

FIG. 1 (not necessarily drawn to scale) illustrates schematically a system, designated generally by the reference numeral 10, for vacuum extraction and treatment in accordance with the invention. Seen in FIG. 1 is a source 12 of volatile contaminants, creating a plume 14 of adsorbed, dissolved, or suspended free phase and gaseous phase contaminants in the soil 16 of the vadose (unsaturated) zone. The contaminants making up the plume 14 tend to leach or percolate downwardly toward the natural water table 18. Groundwater is moving in the direction of the arrows 19. Components lighter than water and not dissolved are depicted by the reference numeral 20, and tend to float at the top of the water table. Dissolved contaminants tend to percolate downwardly in a plume 22 below the water table 18, and free-phase components 24 heavier than water tend to migrate downwardly to the aquitard 26.

An extraction well, designated generally by the reference numeral 28, and which will be described in greater detail shortly, is sunk in the area of the plume 14 and extends through the vadose zone and below the natural water table 18. Associated with the extraction well 28 is a vacuum extraction system, designated by the reference numeral 32, preferably designed to generate high vacuum conditions, typically from about 7 to about 29 inches of mercury. Gases removed by the vacuum extraction system 32 can be vented to atmosphere at 34 if within acceptable environmental limits, or further processed, such as by being incinerated or passed to a condenser, granular activated carbon filter, or other such component 36. The component 36 serves to remove contaminants from the extracted gases. Water extracted by the process can be treated by passing it through conventional systems for metals removal, volatile organic compound removal, or other steps of purification. The treated and purified water, if it is of sufficient purity at this stage, can be returned to a sewer or directly to the ground as indicated at 38. Contaminants can be stored in drums 40 for eventual destruction or further processing. One specific system for treating gases and liquids extracted from well 28 through vacuum extraction system 32 is disclosed in copending application U.S. Ser. No. 08/236,791, filed Apr. 29, 1994, entitled "Apparatus and Process for Treating Contaminated Soil Gases and Liquids," with the named inventors Eliott N. Duffney, Paul M. Tornatore, Scott M. Huber, and Ronald E. Hess, the disclosure of which is totally incorporated herein by reference.

Figure 2:
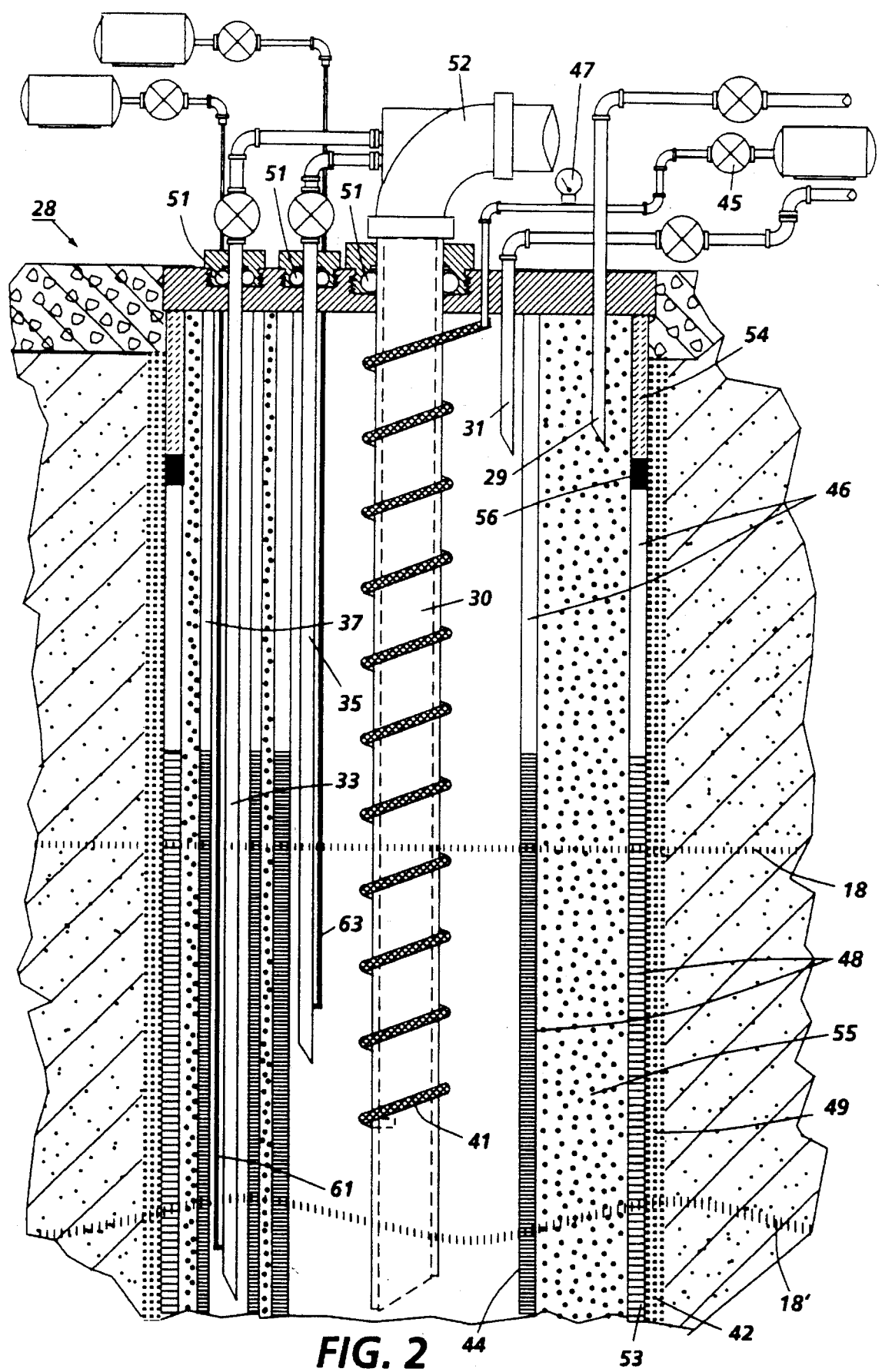

FIG. 2 (not necessarily drawn to scale) illustrates extraction well 28 in greater detail. As illustrated schematically in FIG. 2, the extraction well 28 in the illustrated form of the invention includes an elongated borehole 42, into which is placed an outer perforated riser pipe 53. Situated within outer perforated riser pipe 53 is inner riser pipe 44. Both inner riser pipe 44 and outer riser pipe 53 are sealed at the bottom. Outer riser pipe 53 and inner riser pipe 44 are perforated either below the water table or both below and above the water table. The perforations in the riser pipes can be either at the same depth or at different depths in the ground; in FIG. 2, outer riser pipe 53 and inner riser pipe 44 have perforations to the same depth in the ground, but this illustrated feature is not required. In the embodiment illustrated, the riser pipes include an imperforate upper portion 46 and a perforate (screened) lower portion 48. Outer riser pipe 53 and inner riser pipe 44 can be of any suitable material, such as polyvinyl chloride, metals, such as stainless steel, galvanized steel, or the like, plastics, including Teflon®, or the like, and outer riser pipe 53 need not be of the same material as inner riser pipe 44. Outer riser pipe 53 and inner riser pipe 44 can be of any desired relative dimensions with respect to each other, provided that inner riser pipe 44 fits within outer riser pipe 53 and provided that filler material 55 and intermediate riser pipe 37 (containing outer extraction pipe 33) can be situated between inner riser pipe 44 and outer riser pipe 53; in one embodiment of the invention, for example, inner riser pipe 44 is from about 4 to about 6 inches in diameter and outer riser pipe 53 is from about 12 to about 14 inches in diameter; other dimensions and relative dimensions can, however, be selected. The screened or perforate portion can have perforations of any desired or suitable shape and size; for example, in one embodiment, the perforated portion of both the inner riser pipe and the outer riser pipe can be equipped with 0.010 inch slots. In a preferred embodiment, the perforations in outer riser pipe 53 are larger (i.e., greater in area, or of wider screening) than the perforations in inner riser pipe 44, so that some particulate matter which could pass through the perforations in outer riser pipe 53 could not pass through the perforations in inner riser pipe 44. Situated inside inner riser pipe 44 is inner vacuum extraction pipe 30 and optional additional inner vacuum extraction pipe 35. Situated between the outer wall of inner riser pipe 44 and the inner wall of outer riser pipe 53 is intermediate riser pipe 37 containing outer vacuum extraction pipe 33. Intermediate riser pipe 37 is similar in configuration, construction, and materials to outer riser pipe 53 and inner riser pipe 44, and is of a suitable size to fit between the outer surface of inner riser pipe 44 and the inner surface of outer riser pipe 53. Intermediate riser pipe 37 is not required, and outer vacuum extraction pipe 33 can be situated between outer riser pipe 53 and inner riser pipe 44 without being encompassed in a perforated riser pipe; the presence of a perforated riser pipe is, however, preferred when a filler material is situated between outer riser pipe 53 and inner riser pipe 44. In a preferred embodiment, the perforations in outer riser pipe 53 are larger (i.e., greater in area, or of wider screening) than the perforations in intermediate riser pipe 37, so that some particulate matter which could pass through the perforations in outer riser pipe 53 could not pass through the perforations in intermediate riser pipe 37. Vacuum extraction pipes 30, 33, and 35 can be of any suitable material, such as polyvinyl chloride, metals, such as stainless steel, galvanized steel, or the like, plastics, including Teflon®, or the like, and may be either rigid or flexible. The upper ends of inner riser pipe 44 and outer riser pipe 53 are here shown to be associated with a concrete floor or deck, and are provided with a suitable pipe fitting 52, enabling the riser pipes 44 and 53 and the vacuum extraction pipes 30, 33, and 35 to be coupled to the remainder of the vacuum extraction system 32 (not seen in FIG. 2), with vacuum extraction pipes 30, 33, and 35 being in fluid communication with the vacuum extraction system. In the illustrated embodiment, vacuum extraction pipes 30, 33, and 35 are all in fluid communication with a single vacuum extraction system. Alternatively (not shown), two or more vacuum extraction systems can be employed if desired, particularly if a single vacuum extraction pump is of limited capacity and/or if rapid extraction in a heavily contaminated area is desired. In a preferred embodiment, vacuum extraction pipes 30, 33, and 35 are easily movable within the riser pipes 44 and 53 without the need to halt operation of the two-phase vacuum extraction process. For example, the vacuum extraction pipes can be maintained within the riser pipes by a coupling device that enables the vacuum to be maintained within the riser pipes but also permits the vacuum extraction pipes to slide up and down to different depths within the well. Suitable arrangements include vacuum-tight O-ring mechanisms, tapered rubber "stopper" arrangements, vacuum rated compression fittings, and the like, with O-rings 51 being illustrated in FIG. 2. Vacuum extraction pipes 30, 33, and 35 can each have a bottom opening within outer riser pipe 53 (and within inner riser pipe 44 as well in the case of inner vacuum extraction pipes 30 and 35, and within intermediate riser pipe 37 as well in the case of outer vacuum extraction pipe 33) either below the water table, at the water table level, or slightly above but near to the water table. Vacuum extraction pipes 30, 33, and 35 may terminate at the same depth or at different depths in the ground. In situations wherein contaminants are located at two or more distinct depths, it may be desirable to situate multiple vacuum extraction pipes such that one or more vacuum extraction pipe has an opening at each level of contamination. While not necessary, it is preferred that the bottom of vacuum extraction pipes 30, 33, and 35 terminate at an angle other than exact parallel with the horizontal; by terminating the pipe at an angle, the surface area of the opening is increased, which enhances the ease of starting the well. Preferred angles for the bottom opening of vacuum extraction pipes 30, 33, and 35 are from about 10° to about 80° with respect to the horizontal, and more preferably about 45° with respect to the horizontal, although the angulation can be outside this range.

Also situated at the end of extraction well 28 at or near the ground surface is an air inlet 31, preferably equipped with an air flow gauge (not shown), which permits the introduction of air at any desired pressure, including reduced pressures, atmospheric pressure, or increased or forced pressures, into inner riser pipe 44. Optionally, an air inlet 29 can be situated in the space between outer riser pipe 53 and inner riser pipe 44 to permit the introduction of air into this space. When it is desired to add air at pressures greater than atmospheric pressure, air pressure can be provided by an additional pump (not shown), by connecting the outlet or exhaust of the vacuum pump connected to the vacuum extraction pipes to air inlets 31 and 29, or the like. The air flow rate through air inlets 31 and 29 can range from nearly zero to any value less than the CFM rated capacity of the vacuum pump connected to the vacuum extraction pipes. While some air flow may be necessary at system start-up, after the process has been in operation for a period of time, the air flow may in some instances be reduced to zero, with no air being introduced into the well through air inlets 31 or 29 and maximum vacuum being applied to the sub-surface soil and water. In addition, the air introduced through air inlets 31 and/or 29 can, if desired, be heated to improve the extraction of some contaminants. Further, air inlets 31 and 29 can be used as an inlet for introducing other materials or chemicals into the inner riser pipe 44 and extraction stream, since chemicals or materials so introduced will pass down with the inlet air through the riser pipe to the bottom thereof, and then back up with the water and air mixture through the vacuum extraction pipes, thus chemically or otherwise interacting with the water and air mixture. For example, oxidizers or surfactants or other chemicals can be introduced for the treatment of water-borne or vapor-borne contaminants removed by the vacuum extraction pipes. Additionally, in situations wherein the apparatus and process of the present invention are employed in conjunction with a biotransformation process, wherein soil contaminants are biologically transformed into innocuous materials by interaction with bacteria or other biological methods, gas inlet or inlets can be employed to introduce into the vacuum extraction pipes nutrients for biotransformation, such as cellulose or the like, or for introducing nitrogen to enhance anaerobic processes or oxygen to enhance aerobic processes. Further information regarding biological processes for treating soil contaminants is disclosed in, for example, W. K. Ahlert et al., "In situ Bioremediation of Soil Contaminated with Methyl Benzene Species," M. A. Franson, "In Situ Bioremediation of Unleaded Gasoline Contaminated Ground Water, Plainfield, Conn., A Case Study," and M. Leavitt et al., "Implications of Surfactant Augmentation for In Situ Bioremediation Systems," all contained in In Situ Treatment of Contaminated Soil and Water, Proceedings of the 1992 U.S. EPA/A&WMA International Symposium, Air and Waste Management Association (Pittsburgh 1992); and Subsurface Restoration Conference, Jun. 21–24, 1992, Dallas, Tex. (Rice University Dept. of Envi. Sci. & Eng., Houston Tex. 1992); the disclosures of each of which are totally incorporated herein by reference.

Liquid drawn up through vacuum extraction pipes 30, 33, and 35 generally is in two-phase form, namely either segregated two-phase flow, including stratified flow, wavy flow, and annular flow, intermittent two-phase flow, including plug flow and slug flow, or distributed two-phase flow, including bubble flow and mist flow, with droplets, mist, and/or vapor entrained in liquid being preferred to slug flow. Air flow through the system is provided by one or more of the following: air from the unsaturated (vadose) zone; air from the dewatered saturated zone; air from the air inlet mechanism 31 (and 29, when present), at reduced pressures, atmospheric pressure, or forced pressures; and air from gas inlet or inlets 41, 61, and 63 at atmospheric pressure or forced pressures. Thus, it is not required that air be extracted from the ground in the vicinity of the extraction well. Generally, a high vapor/air velocity is maintained through the system. Air velocity in the vacuum extraction pipe should be sufficient to carry or lift water in the vapor phase, either droplets of various sizes, or the like, entrained in the air. Air velocity values in the range of from about 1 foot per second to about 200 feet per second or greater generally suffice.

Inner vacuum extraction pipe 30 is equipped with at least one gas inlet 41. As illustrated in FIG. 2, inner vacuum extraction pipe 30 is equipped with a single gas inlet 41. Other possible configurations for the gas inlet 41 are shown in, for example, FIGS. 3 and 4 of copending application U.S. Ser. No. 08/056,349, filed Apr. 30, 1993, entitled "Improved Process and Apparatus for High Vacuum Groundwater Extraction," with the named inventors Alfonso R. Mancini, Ronald E. Hess, Richard A. Williams, Douglas J. Montgomery, and Heinrich J. Jurzysta, the disclosure of which is totally incorporated herein by reference. Similarly, outer vacuum extraction pipe 33 is equipped with a single gas inlet 61 and optional additional inner vacuum extraction pipe 35 is equipped with a single gas inlet 63.

More specifically, as shown in FIG. 2, gas inlet 41 enters inner vacuum extraction pipe 30 through an opening in the side of inner vacuum extraction pipe 30. Alternatively (not shown), gas inlet 41 can enter inner vacuum extraction pipe 30 through from the bottom opening of vacuum extraction pipe 30. Gas inlet 61 is arranged similarly with respect to outer vacuum extraction pipe 33 and optional gas inlet 63 is arranged similarly with respect to optional additional inner vacuum extraction pipe 35, although there is no requirement that all vacuum extraction pipes have identically configured gas inlets; for example, one vacuum extraction pipe can have a gas inlet entering through an opening in the side of the pipe, while another vacuum extraction pipe has a gas inlet entering through the bottom opening of the pipe, and a third vacuum extraction pipe has multiple gas inlets. Gas inlets 41, 61, and 63 are each in fluid communication with a gas supply, which can be either atmospheric air or some other desired gas, and with an optional air compressor. In the embodiment illustrated in FIG. 2, each gas inlet is equipped with its own gas supply; alternatively (not shown), two or more gas inlets can be connected to the same air supply. A tank containing compressed air can also serve as the gas supply. The gas supply to gas inlet 41 is controlled through valve 45 and the pressure in gas inlet 41, if desired, can be monitored with optional pressure gauge 47. In addition, if desired, an automatic controller for turning valve 45 on and off and/or for controlling the duration and/or pressure of the gas applied to inner vacuum extraction pipe 30 from gas inlet 41 can be added to the configuration of gas inlet 41. Gas inlets 61 and 63 are also equipped with valves and can also have optional pressure gauges and/or controllers.

In operation, gas is introduced into a vacuum extraction pipe either before, while, or after a vacuum is applied to the vacuum extraction pipe to initiate two-phase flow within the vacuum extraction pipe 30. In embodiments wherein vacuum extraction pipes 30, 33, and 35 are each equipped with single gas inlets 41, 61, and 63, respectively, as illustrated in FIG. 2, gas can be applied through the gas inlets continuously as vacuum is applied to vacuum extraction pipes until two-phase flow is established within the vacuum extraction pipes, at which point the flow of gas through the gas inlet is halted. The actual duration for application of gas through the gas inlets will vary depending on factors such as the depth of the well, the depth within the well of the particular gas inlet, the depth of groundwater contained within the particular vacuum extraction pipe, the dimensions of the well, the vacuum extraction pipe, and the gas inlet, the pressure of gas applied through the gas inlet, and the like. Typical duration times for wells 4 inches in diameter and wherein gas is introduced at a pressure of from about 20 to about 60 pounds per square inch are from about 15 to about 20 seconds when the groundwater level is less than 15 feet deep and about 45 seconds when the groundwater level is from about 18 to about 25 feet deep. In some instances, durations for applying gas through gas inlet 41 may be 5 minutes or greater.

In embodiments of the present invention wherein the vacuum extraction pipes are equipped with a multiplicity of gas inlets (not shown), gas is typically applied first through the uppermost gas inlet continuously as vacuum is applied to the vacuum extraction pipe until two-phase flow is established within the vacuum extraction pipe from the depth of the uppermost gas inlet. At this point, the flow of gas through the inlet next in depth is initiated and maintained until two-phase flow is established within the vacuum extraction pipe from the depth of this gas inlet. Subsequently, the flow of gas through the inlet next again in depth is initiated and maintained until two-phase flow is established within the vacuum extraction pipe from the depth of this next gas inlet. The flow of gas through each inlet can be terminated once two-phase flow is established from that depth, although it is preferred to maintain at least some overlap between the flow of gas through one inlet and the flow of gas through the inlet next in depth to ensure that two-phase flow does not cease in the vacuum extraction pipe at any time. The duration of flow through each inlet and the duration of overlap for flow from two or more inlets will vary with each well. It is also possible, however, to initiate flow through each inlet sequentially, with no overlap between the flow through one inlet and the flow through another inlet, or to initiate flow in multiple inlets in some order other than sequentially by increasing depth. Further, flow through multiple gas inlets can be initiated simultaneously. If desired, the flow duration through each gas inlet can be controlled automatically by running each gas inlet through a timer control system.

Generally, flow through the gas inlet or inlets is ceased once the two-phase vacuum extraction process has been successfully initiated. At various times in the extraction process, however, the flow through the vacuum extraction pipes may vary from the desired two-phase flow to some other form of flow, such as slug flow. At these times, gas may also be introduced through gas inlet or inlets 41, 61, and/or 63 to convert the flow in vacuum extraction pipes 30, 33, and 35, respectively, back to the desired two-phase form. Gas flow through gas inlets 41, 61, and 63 can be simultaneous, wherein gas is introduced into vacuum extraction pipes 30, 33, and 35, respectively, simultaneously, separate, wherein gas is introduced into less than all of the vacuum extraction pipes, or in concert, wherein gas is introduced into some or all of the vacuum extraction pipes in a pattern or series.

The gas inlet or inlets 41, 61, and 63 can be either flexible or rigid, and can be of any suitable material, such as polymers and plastics, including polyvinyl chloride, Teflon®, polyethylene, polypropylene, or the like, metals, such as stainless steel, galvanized steel, copper, brass, or the like, or any other suitable material. While not required, in a preferred embodiment, one or more of the gas inlets is flexible and is wound around the vacuum extraction pipe into which it opens in a coil, with the surface of the gas inlet tubing being non-tacky (wire braid, for example), thereby enabling the gas inlet tubing to expand and contract in a spring-like fashion when the vacuum extraction pipe to which it is attached is raised or lowered within the well. The gas inlet or inlets 41, 61, and 63 can be of any desired or suitable dimensions to enable the desired rate of flow through the vacuum extraction pipes, and typically will vary depending on the dimensions of the vacuum extraction pipe to which the gas inlet is attached, the depth of the well, the nature of the packing around the well, and the like. Typically, in a well about 4 inches in diameter, for example, a vacuum extraction pipe is from about ½ inch to about 3 inches in diameter and a gas inlet tube is from about ¼ to about ½ inch in diameter. Other relative dimensions, however, may of course be employed.

Any desired pressure can be employed for the gas introduced into vacuum extraction pipes 30, 33, and 35 through gas inlets 41, 61, and 63, respectively. Typical pressures range from atmospheric pressure outside the well (in which case no air compressor is required) to about 100 pounds per square inch, with preferred pressures being from about 20 to about 60 pounds per square inch, more preferably from about 30 to about 50 pounds per square inch, although the pressure can be outside these ranges. Greater pressures initiate two-phase flow within the vacuum extraction pipe more rapidly, and may also be more desirable at greater relative depths of water (with relative depth in this instance referring to the difference in depth between the gas inlet and the groundwater level within its vacuum extraction pipe).

Any desired gas can be introduced into the vacuum extraction pipes through the gas inlets. Ambient air may be selected as the most inexpensive gas. In addition, the air introduced through gas inlets 41, 61, and 63 can, if desired, be heated to improve the extraction of some contaminants. Further, gas inlets 41, 61, and 63 can be used as inlets for introducing other materials or chemicals into the riser pipe and extraction stream for chemically or otherwise interacting with the water and air mixture. For example, oxidizers or surfactants o r other chemicals can be introduced for the treatment of water-borne or vapor-borne contaminants removed by the vacuum extraction pipe. Additionally, in situations wherein the apparatus and process of the present invention are employed in conjunction with a biotransformation process, wherein soil contaminants are biologically transformed into innocuous materials by interaction with bacteria or other biological methods, the gas inlets can be employed to introduce into the vacuum extraction pipe nutrients for biotransformation, such as cellulose or the like, or for introducing nitrogen to enhance anaerobic processes or oxygen to enhance aerobic processes.

Additional inner vacuum extraction pipes, situated within inner riser pipe 44, and outer vacuum extraction pipes, situated between inner riser pipe 44 and outer riser pipe 53, can also be added to the system if desired.

Returning to FIG. 2, the upper portion 46 of outer riser pipe 53 is surrounded by a low permeability grout, such as bentonite cement 54, and below the grout 54 by a bentonite seal 56. The area within the borehole 42 surrounding the screened lower portion 48 of outer riser pipe 53 and part of the upper portion 46 above the screened lower portion 48 is packed with fine screened sand 49, to facilitate the flow of gas and liquid from the surrounding soil into outer riser pipe 53. While not required, it is preferred to provide filler material 55 situated between the outer wall of inner riser pipe 44 and the inner wall of outer riser pipe 53. Filler material 55 can be any suitable medium through which gases and liquids can pass, but which tends to inhibit passage of soil particles, and can be either a natural material or a synthetic material. Examples of suitable filler materials include sand, clays, diatomaceous earth, ceramics, stones, sintered metals, fiberglass, carbon, cellulose, cotton, pearlite, fly ash, aluminas, polypropylene, polyesters, polyethylene, polysulfones, polycarbonates, nylon, rayon, teflon, and the like, as well as mixtures of fillers.

In a preferred form of the invention, the extraction well 28 is constructed so that the screened lower portion 48 extends below the natural water table and upwardly into the vadose zone. The vadose zone into which the screened lower portion 48 extends can be the natural water table 18, or the expanded artificial vadose zone created when prolonged removal of groundwater through the extraction well causes local lowering of the water table, as indicated by the reference numeral 18' in FIG. 2. As shown, the depressed water table 18' is situated so that the bottom openings of vacuum extraction pipes 30 and 33 are below the water level and the bottom opening of vacuum extraction pipe 35 is above the water level; in some situations, such as when the process is performed in extremely sandy soil, the depressed water table 18' may drop to the level of the bottom of one or more or, in some instances, all, of the vacuum extraction pipes. Placement of the screened lower portions 48 of the riser pipes 44 and 53 both below the water table and in the vadose zone allows soil gases (the vapor phase) to be drawn into the well under the influence of vacuum created by the extraction system 32 and to entrain the liquid phase so that both phases can be transported to the surface together. As will be explained, at the surface, the two phases can be separated and differently treated.

Alternatively (not shown), the extraction well 28 can be so constructed that the screening of the lower portion 48 is entirely submerged, i.e., disposed below the natural or actual water table, even after withdrawal of water under the influence of the vacuum extraction system 32. In the latter case, the fluid transported to the surface is predominantly in the liquid phase, although the influence of the vacuum generally results in the presence of a gas phase comprising volatilized liquids.

FIG. 3 (not necessarily drawn to scale) illustrates schematically in greater detail the vacuum extraction system 32 and the steps and apparatus for treating extracted material. A vacuum pump 78, driven by electric motor 80, is in fluid communication through a pipe 82, knock-out pot 84 and pipe 86 with the pipe fitting 52 of extraction well 28. The knock-out pot 84 can be of conventional design, familiar to those skilled in the art.

The knock-out pot 84 serves to separate the two phases emerging from the extraction well 28, enabling them to be subjected to appropriate further processing. In this regard, a pipe 88 is provided in association with the knock-out pot 84, to conduct effluent in the liquid phase through filtration and stripping steps. Filtration is provided in the illustrated embodiment by parallel filters 90 and 92 which can alternately or simultaneously be used in a conventional manner. Cut-off valves, omitted in the drawings for clarity, permit either filter 90 or 92 to be isolated and each filter to be removed, cleaned, or replaced. Suitable pressure gauges (not shown) can be placed on the suction and discharge sides of the filters 90 and 92 to indicate filter loading. Examples of suitable filters 90 and 92 include the Series 500 filter bags (523, 525, 527,529) 3M Filtration Products, available from Aftek, Inc. Other separation techniques and apparatus can also be used.

A pump 94, for erosion resistance preferably of the single stage progressive cavity (screw) type, serves to draw off the liquid phase effluent of the knock-out pot 84. An example of a suitable progressive cavity pump is sold by Bornemann Pumps, Inc., Model E4H-1024-P1. An example of a suitable centrifugal pump is sold by Siewert Equipment, Inc., Model AC100A1. Here, too, other suitable apparatus can be used.

In the illustrated embodiment, the liquid phase is fed from the pump 94 through a pipe 96 to an optional air stripper assembly 98, the function of which is to remove from the effluent volatile organic compounds. A blower 100 associated with the air stripper assembly 98 delivers a flow of warm air through the housing of the air stripper assembly 98, carrying off the volatile organic compounds through the vent 102 to atmosphere or further processing (not shown). A transfer pump 104, discharging to a pipe 106, serves to transport liquid from the sump of the air stripper assembly 98 for further processing. The transfer pump 104 can be turned off in response to a low level switch 108 associated with the air stripper assembly 98. A high level switch 110 associated with the air stripper assembly 98 controls the pump 94 in response to high water level in the air stripper assembly 98. The air stripper assembly 98 can be a conventional "off-the-shelf" unit, familiar to those skilled in the art.

The optional air stripper assembly 98 can, if desired, be omitted, and the effluent of the pipe 96 joined with the effluent of the pipe 120. It is hypothesized that the intimate mixing of the air and water during extraction (at which time groundwater is extracted in an air stream under vacuum) allows the volatile compounds to come out of solution, thus obviating the need for later air stripping.

Avoidance of the need for an air stripper assembly 98 also reduces the total volume of air streams bearing volatile organic compounds. In situations in which air emissions must be controlled, this is a distinct advantage. Another advantage of the two-phase vapor extraction process, as practiced without additional air stripping, is that due to the low pressure at which the vapor/liquid mixing and separation are accomplished, there is no less oxygenation of the water than would result from conventional air stripping. It is to be expected that lower dissolved oxygen levels will result in less corrosion and fouling of downstream components of the apparatus.

As indicated above, under the influence of the vacuum pump 78 the vapors separated from the two-phase effluent from the extraction well 28 are drawn to vacuum pump 78. In the illustrated embodiment of the invention, the vacuum pump 78 is of the liquid ring type, and is provided with a make up water line 112, served by a domestic supply. The make up water line 112 is provided with a solenoid actuated valve 114 responsive to the high water level switch 110 of air stripper assembly 98.

The pump 78 exhausts to a vapor/liquid separator 116, the vapor effluent of which is conducted to atmosphere, or if appropriate to further processing through a pipe 118. The bulk of the liquid effluent from the vapor liquid separator 116 passes through a pipe 120 to a sump 122, where it joins the effluent of the pipe 106, the liquid output of the air stripper assembly 98. A fraction or all of the liquid effluent of the vapor liquid separator 116 can be drawn off through a line 124 to join the flow in the make up water line 112 servicing the liquid ring pump 78.

A pump 126, controlled by a low level cut-off switch 128, draws liquid from the sump 122 and propels it through a pipe 130 for further processing. In the illustrated embodiment, the liquid is passed in two stages through canisters 132 and 134 containing granular activated carbon. Other contaminant removal steps or techniques can be used. The treated water emerges through a pipe 136 and is of sufficient purity to allow its return to the soil or a sewer without further treatment.

FIG. 4 (not necessarily drawn to scale) illustrates schematically an example of an optional air inlet well 57. The air inlet well 57 comprises a borehole 58, which receives a pipe 60. The pipe 60 in one operative embodiment comprises a four inch diameter PVC pipe, as illustrated, capped at the bottom (although the pipe may also be open at the bottom), and having a screen of 0.010 inch slots. The pipe 60 is surrounded at its upper end by a cement collar 62, extending to the ground surface 64. Suitable covers 68 can be provided in association with the collar 62 to cover selectively the injection well as desired. Cover 68 generally is air permeable, at least to some extent. Surrounding a medial portion 70 of the pipe 60 within the borehole 58 is a bentonite slurry 72, which provides a gas-tight seal between the pipe 60 and the borehole 58. The screened lower portion 74 of the pipe 60 is surrounded by gas-permeable packed sand 76. As will now be apparent, the pipe 60 facilitates the injection of air into the zone surrounding the plume 14 (shown in FIG. 1).

One advantage of the application of vacuum extraction in accordance with the present invention is that the rate of production of groundwater may be significantly increased over conventional single phase flow rates. By applying vacuum to the subsurface using the vacuum extraction pipe 30 and vacuum extraction system 32 as described above, water is drawn from the soil by the fluid dynamic effects of sweeping air and soil gases over the aquifer surface toward the well and also by the artificial creation of a low head (water pressure) inside the riser pipes 44 and 53. The low head in the riser pipes 44 and 53 makes it, in effect, a low point in the hydraulic system so that water in the surrounding soil readily flows to it.

Artificially increasing the rate of production of groundwater over what can be achieved with conventional pumps is especially beneficial in subsurface formations through which natural recharge is slow. In addition to increasing the size of the groundwater capture zone around the extraction well 28, operation of the above-described apparatus 10 depresses the natural water table, thereby increasing the volume of the vadose zone which is subject to clean up by the vapor extraction mechanism generated by the apparatus 10. Tangible benefits include shortening of the duration of the treatment time and reduction of the cost of the overall contaminant removal effort.

The apparatus and process of the present invention, being equipped with the vacuum extraction pipes and the air inlet means, enable removal of liquid and/or gaseous contaminants from soils of varying air permeability and varying porosity, since the extraction system no longer depends upon the air permeability or porosity conditions of the soil to provide air flow and water flow into the riser pipe sufficient to match the vacuum pump characteristics. The air inlet, when equipped with a valve, allows the adjustment of the introduced air flow to match the specific site soil conditions. The air inlet and valve provide air to displace water from the well through the vacuum extraction pipe. In addition, the present invention enables increased flexibility in the location of extraction wells, since soil conditions with respect to air flow through the soil are not critical, thus allowing the well to be situated in areas of greatest contamination without considering irregular or difficult soil conditions in those areas. Further, the vacuum extraction pipe and the air inlet mechanism enable vacuum extraction of contaminants through wells from below the water table even when the water table is deeper than the equivalent lift of the vacuum pump connected to the well. In addition, when the water table is at a depth of greater than about 35 feet, the lift required to remove liquid contaminants can be expected to be greater than any commercially available vacuum pump; the apparatus and process of the present invention, however, enable removal of liquid and gaseous contaminants even from depths of 35 feet or greater. Nearly any rate vacuum pump can be used for extraction with the present invention; a low CFM rate pump can still extract water from a substantial depth of water table. Additionally, the apparatus and process of the present invention are suitable for extraction of contaminants by systems equipped to extract from only below the water table and by systems equipped to extract from both the vadose zone and below the water table.

The apparatus and process of the present invention enable the above advantages while also enabling this process in wells of great depth. The apparatus and process are suitable for use in wells of 100 feet, 200 feet, or more. In wells wherein the natural water table is situated at a depth of 20 feet or greater, and in wells wherein it is desired to lower the groundwater level to depths of 60 feet or greater, embodiments of the present invention employing multiple gas inlets are generally preferred. Further, the apparatus and process of the present invention enable the above advantages while also enabling rapid, simple, and efficient start-up of the pumping process. For example, if a well is situated in an area where the natural water table is at a depth of 10 feet and if the level of groundwater drops to a depth of 45 feet during the vacuum extraction process, the vacuum extraction pipes will initially contain groundwater at a depth of about 10 feet below the ground surface prior to initiation of the extraction process. If the process is initiated by moving the vacuum extraction pipes to a level slightly below the groundwater level and continuing to adjust the height of the vacuum extraction pipes within the riser pipes until the groundwater level drops to 45 feet, the start-up process will typically require at least one person, and more often at least two persons, at least 45 minutes to complete the start-up process. In contrast, with the apparatus and process of the present invention, the height of the vacuum extraction pipes within the riser pipes need not be adjusted to initiate two-phase flow. If performed manually, the start-up process for each well typically requires one person about 45 seconds to complete, and if performed by an automated process, start-up requirements are lessened to an even greater degree in terms of time and numbers of persons required. Further, the apparatus and process of the present invention minimize the "down time" of operating vacuum extraction wells. If the two-phase flow through the vacuum extraction pipes is halted, subsequent restart of the well can be time-consuming, and since groundwater flows into the area around the well between the time of the halt of operation and subsequent restart, returning that particular well to its previous level of efficiency in terms of the concentration of contaminants removed per minute can take hours or days. With the process and apparatus of the present invention, two-phase flow through the vacuum extraction pipes is less likely to be interrupted, and if it is interrupted, restoring of the two-phase flow can be done rapidly; thus, restoration of the well to its previous level of contaminant removal efficiency is also relatively rapid. Extraction of contaminants is rapid and efficient. Movability of the vacuum extraction pipes within the riser pipes also enables adjustment of the depth of the vacuum extraction pipes in the well without the need to halt the extraction process; when the vacuum extraction pipes are of a flexible material, their depth in the well can also be adjusted within deep wells when the surface opening of the well is situated under a roof. Further, contaminants can be extracted with reduced contamination of the vacuum extraction system by soil and sand.

Other embodiments and modifications of the present invention may occur to those skilled in the art subsequent to a review of the information presented herein; these embodiments and modifications, as well as equivalents thereof, are also included within the scope of this invention.

What is claimed is:

1. A process for removing contaminants from a contaminated area of the ground having a vadose zone and a water table, which comprises providing a borehole in the contaminated area to a depth below the water table; placing in the borehole to a depth below the water table a first perforated riser pipe; placing inside the first perforated riser pipe a second perforated riser pipe; placing inside the second perforated riser pipe a first vacuum extraction pipe with a bottom opening situated within the second perforated riser pipe; placing a second vacuum extraction pipe within the first perforated riser pipe but without the second perforated riser pipe; while introducing a gas into the second perforated riser pipe, applying a vacuum to the first vacuum extraction pipe and applying a vacuum to the second vacuum extraction pipe to draw gases and liquid from the soil into the first vacuum extraction pipe and the second vacuum extraction pipe and transport both gases and liquid to the surface as two-phase common streams through the first vacuum extraction pipe and the second vacuum extraction pipe; forming from the common streams at least one primarily liquid stream and at least one primarily gaseous stream; and separately treating the separated liquid and gas streams.

2. A process according to claim 1 wherein the perforations in the first perforated riser pipe and the second perforated riser pipe are situated only below the water table.

3. A process according to claim 1 wherein the perforations in the first perforated riser pipe and the second perforated riser pipe are situated both in the vadose zone and below the water table.

4. A process according to claim 1 wherein the first vacuum extraction pipe contains groundwater prior to application of a vacuum thereto, the first vacuum extraction pipe has at least one gas inlet situated below the groundwater level in the first vacuum extraction pipe, and a gas is introduced into the first vacuum extraction pipe at a level below the groundwater level in the first vacuum extraction pipe to initiate two-phase flow within the first vacuum extraction pipe.

5. A process according to claim 1 wherein a third vacuum extraction pipe is situated within the second perforated riser pipe, said third vacuum extraction pipe having a bottom opening situated within the second perforated riser pipe, and wherein a vacuum is applied to the third vacuum extraction pipe to draw gases and liquid from the soil into the third vacuum extraction pipe and transport both the gases and the liquid to the surface as a two-phase common stream.

6. A process according to claim 1 wherein the first vacuum extraction pipe is movably situated within the second perforated riser pipe, thereby enabling adjustment of the depth of the bottom opening of the first vacuum extraction pipe within the second perforated riser pipe.

7. A process according to claim 1 wherein the second vacuum extraction pipe contains groundwater prior to application of a vacuum thereto, the second vacuum extraction pipe has at least one gas inlet situated below the groundwater level in the second vacuum extraction pipe, and a gas is introduced into the second vacuum extraction pipe at a level below the groundwater level in the second vacuum extraction pipe to initiate two-phase flow within the second vacuum extraction pipe.

8. A process according to claim 1 wherein a filler material is situated between the first perforated riser pipe and the second perforated riser pipe.

9. A process according to claim 1 wherein a gas is introduced into an area defined by the first perforated riser pipe inner surface and the second perforated riser pipe outer surface while vacuum is applied to the first vacuum extraction pipe and the second vacuum extraction pipe.

10. An apparatus for removing contaminants from a contaminated area of the ground having a water table and a vadose zone above the water table which comprises a first perforated riser pipe extending downwardly from the surface of the ground to a level below the water table, a second perforated riser pipe situated inside the first perforated riser pipe and extending downwardly from the surface of the ground to a level below the water table, a first vacuum extraction pipe situated inside of the second perforated riser pipe and having a bottom opening situated within the second perforated riser pipe, a second vacuum extraction pipe situated inside the first perforated riser pipe but without the second perforated riser pipe, a gas inlet for introducing a gas into the second perforated riser pipe, at least one vacuum-forming apparatus in fluid communication with the first vacuum extraction pipe and the second vacuum extraction pipe and adapted to form a zone of reduced pressure in the ground around the first perforated riser pipe, whereby gases and liquid can be drawn from the ground into the first vacuum extraction pipe and the second vacuum extraction pipe and conveyed to the surface as two-phase common streams, and a means for receiving the two-phase common streams and separating the two-phase common streams into separate gas and liquid streams.

11. An apparatus according to claim 10 wherein the perforations in the first perforated riser pipe and the second perforated riser pipe are situated only below the water table.

12. An apparatus according to claim 10 wherein the perforations in the first perforated riser pipe and the second perforated riser pipe are situated both in the vadose zone and below the water table.

13. An apparatus according to claim 10 wherein the first vacuum extraction pipe contains groundwater prior to application of a vacuum thereto, and the first vacuum extraction pipe has at least one gas inlet situated below the groundwater level in the first vacuum extraction pipe for introducing a gas into the first vacuum extraction pipe to initiate two-phase flow within the first vacuum extraction pipe.

14. An apparatus according to claim 10 wherein a third vacuum extraction pipe is situated within the second perforated riser pipe, said third vacuum extraction pipe having a bottom opening situated within the second perforated riser pipe, and wherein at least one vacuum-forming apparatus is in fluid communication with the third vacuum extraction pipe.

15. An apparatus according to claim 10 wherein the first vacuum extraction pipe is movably situated within the second perforated riser pipe, thereby enabling adjustment of the depth of the bottom opening of the first vacuum extraction pipe within the second perforated riser pipe.

16. An apparatus according to claim 10 wherein the second vacuum extraction pipe contains groundwater prior to application of a vacuum thereto, and the second vacuum extraction pipe has at least one gas inlet situated below the groundwater level in the second vacuum extraction pipe for introducing a gas into the second vacuum extraction pipe to initiate two-phase flow within the second vacuum extraction pipe.

17. An apparatus according to claim 10 wherein a filler material is situated between the first perforated riser pipe and the second perforated riser pipe.

18. An apparatus according to claim 10 wherein a second gas inlet is situated inside the first perforated riser pipe but without the second perforated riser pipe, through which said second gas inlet a gas can be introduced into an area defined by the first perforated riser pipe inner surface and the second perforated riser pipe outer surface while vacuum is applied to the first vacuum extraction pipe and the second vacuum extraction pipe.

19. An apparatus according to claim 10 also including a means for receiving the gas stream and removing therefrom residual liquid, a vessel for receiving the residual liquid from the gas stream and the liquid stream, and a means for removal of residual contaminants from the liquid.

20. An apparatus according to claim 10 also including at least one air injection well extending downwardly from the surface of the ground and spaced from the first riser pipe.

* * * * *